United States Patent
Chen et al.

(10) Patent No.: US 11,039,117 B2
(45) Date of Patent: Jun. 15, 2021

(54) DUAL LENS IMAGING MODULE AND CAPTURING METHOD THEREOF

(71) Applicant: HTC Corporation, Taoyuan (TW)

(72) Inventors: Yu-Han Chen, Taoyuan (TW); Chung-Hsiang Chang, Taoyuan (TW); Hong-Kai Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/553,115

(22) Filed: Aug. 27, 2019

(65) Prior Publication Data

US 2021/0067761 A1    Mar. 4, 2021

(51) Int. Cl.
*H04N 13/204* (2018.01)
*H04N 5/225* (2006.01)
*H04N 13/296* (2018.01)
*G02B 7/02* (2021.01)
*G02B 7/09* (2021.01)
*G06T 7/571* (2017.01)

(52) U.S. Cl.
CPC .......... *H04N 13/204* (2018.05); *G02B 7/021* (2013.01); *G02B 7/09* (2013.01); *G06T 7/571* (2017.01); *H04N 5/2254* (2013.01); *H04N 13/296* (2018.05); *H04N 2213/001* (2013.01)

(58) Field of Classification Search
CPC .... H04N 13/204; H04N 13/296; G06T 7/571; G02B 7/021; G02B 7/09
USPC ......................................................... 348/46
See application file for complete search history.

(56) References Cited

U.S. PATENT DOCUMENTS

| | | | |
|---|---|---|---|
| 7,565,183 B2 | 7/2009 | Vance et al. | |
| 8,909,037 B1 | 12/2014 | Huang et al. | |
| 10,007,994 B2 | 6/2018 | Grunnet-Jepsen et al. | |
| 2004/0080666 A1* | 4/2004 | Kawano | G02B 7/06 348/373 |
| 2008/0291543 A1 | 11/2008 | Nomura et al. | |
| 2012/0013734 A1* | 1/2012 | Ranieri | G01J 3/02 348/125 |
| 2013/0147924 A1* | 6/2013 | Ho | H04N 13/296 348/47 |

(Continued)

FOREIGN PATENT DOCUMENTS

| | | |
|---|---|---|
| CN | 103293824 | 9/2013 |
| EP | 3492958 | 6/2019 |

(Continued)

OTHER PUBLICATIONS

"Office Action of Taiwan Counterpart Application", dated Apr. 9, 2020, p. 1-p. 7.

(Continued)

*Primary Examiner* — Tat C Chio
*Assistant Examiner* — Kathleen V Nguyen
(74) *Attorney, Agent, or Firm* — JCIPRNET (57) ABSTRACT

A dual lens imaging module suitable for an electronic device is provided. The dual lens imaging module includes a first lens, a second lens, and a moving module. The moving module is connected to the second lens and is adapted to move or tilt the second lens, wherein the first lens is a lens having an autofocus function, and a working distance of the dual lens imaging module is adapted to be changed according to a spacing of the first lens and the second lens.

11 Claims, 5 Drawing Sheets

(56) References Cited

U.S. PATENT DOCUMENTS

| | | | |
|---|---|---|---|
| 2013/0162876 A1* | 6/2013 | Song | H04N 5/23293 348/333.01 |
| 2016/0295097 A1* | 10/2016 | Shanmugavadivelu | H04N 5/232123 |
| 2016/0337560 A1* | 11/2016 | Wynalda, Jr. | H04N 5/2252 |
| 2017/0036647 A1* | 2/2017 | Zhao | B08B 3/02 |
| 2017/0085764 A1 | 3/2017 | Kim et al. | |
| 2017/0184977 A1* | 6/2017 | Jak | G03F 7/70683 |
| 2017/0192199 A1* | 7/2017 | Park | G02B 7/14 |
| 2018/0293745 A1* | 10/2018 | Ha | G06T 5/002 |
| 2019/0158750 A1 | 5/2019 | Kim et al. | |
| 2019/0230264 A1* | 7/2019 | Wakai | G03B 19/07 |
| 2019/0302572 A1* | 10/2019 | Chen | G02B 7/021 |

FOREIGN PATENT DOCUMENTS

| | | |
|---|---|---|
| TW | 201413368 | 4/2014 |
| TW | 201642008 | 12/2016 |
| TW | 201721210 | 6/2017 |
| TW | M558922 | 4/2018 |

OTHER PUBLICATIONS

"Office Action of Taiwan Counterpart Application", dated Nov. 13, 2020, p. 1-p. 5.

\* cited by examiner

DUAL LENS IMAGING MODULE AND CAPTURING METHOD THEREOF

BACKGROUND OF THE INVENTION

Field of the Invention

The invention relates to an optical imaging module and a capturing method thereof, and in particular to a dual lens imaging module and a capturing method thereof.

Description of Related Art

In recent years, with the continued progress in display techniques, the observer's demand for display quality (such as image resolution and color saturation) of a display is also becoming higher. However, in addition to high image resolution and high color saturation, whether the display is able to display a three-dimensional image has gradually become one of the consideration factors for purchase for the viewer. However, in current mobile phones, tablets, or head-mounted displays, the working distance of lens imaging or photography is often limited due to limitations in device size.

In addition, a lot of current image information may also have depth information and be displayed as three-dimensional images. However, in current techniques, three-dimensional imaging or three-dimensional photography cannot be performed via simple members, and at the same time, depth sensing cannot be performed to obtain depth information and optimize three-dimensional image display effects.

SUMMARY OF THE INVENTION

The invention provides a dual lens imaging module that may increase the range of working distance thereof and achieve good display effects for three-dimensional imaging.

The invention provides a dual lens imaging module suitable for an electronic device, including a first lens, a second lens, and a moving module. The moving module is connected to the second lens and adapted to move or tilt the second lens, wherein the first lens is a lens having an autofocus function, and a working distance of the dual lens imaging module is adapted to be changed according to a distance of the first lens and the second lens.

The invention further provides a capturing method of a dual lens imaging module. The dual lens imaging module includes a first lens and a second lens. The capturing method of the dual lens imaging module includes the following steps. A first image and a second image are respectively captured via the first lens and the second lens. A three-dimensional image is formed according to the first image and the second image. The first lens or the second lens is controlled to obtain an optimized data. An optimized three-dimensional image is formed according to the optimized data and the three-dimensional image.

Based on the above, in the dual lens imaging module and the capturing method thereof of the invention, the first lens is a lens having an autofocus function, and the second lens is connected to the moving module to move or tilt to change the spacing with the first lens. Therefore, the dual lens imaging module may be used to capture an object with a greater or smaller working distance, and at the same time is suitable for users with different eye spacing. In addition, the dual lens imaging module may also capture a plurality of images at different positions by moving the second lens to obtain a three-dimensional image capable of displaying a three-dimensional effect. As a result, the range of the working distance of the dual lens imaging module may be improved, and the three-dimensional imaging may obtain a good display effect.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
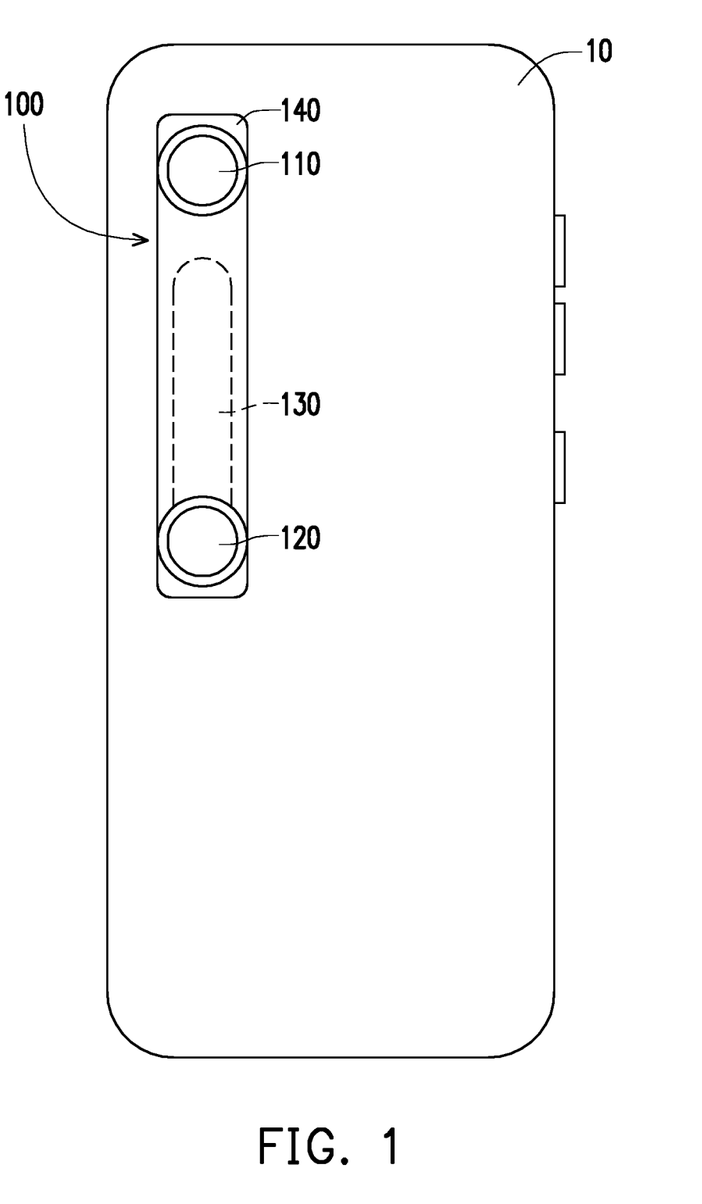
FIG. 1 is a rear view of an electronic device of an embodiment of the invention.

FIG. 1 is a rear view of an electronic device of an embodiment of the invention. Please refer to FIG. 1. The present embodiment provides a dual lens imaging module 100 that may be mounted on an electronic device 10, such as a smart phone, a tablet, a head-mounted display device, etc., and may be applied to a technique such as three-dimensional imaging, three-dimensional photography, panoramic photography, virtual reality (VR), or augmented reality (AR). The present embodiment is described by exemplifying the electronic device 10 as a smart phone, but the invention is not limited thereto. In the present embodiment, the dual lens imaging module 100 may be mounted on one side of the electronic device 10 with respect to the display surface, as shown in FIG. 1. In the present embodiment, the dual lens imaging module 100 includes a first lens 110, a second lens 120, and a moving module 130.

Figure 2A:
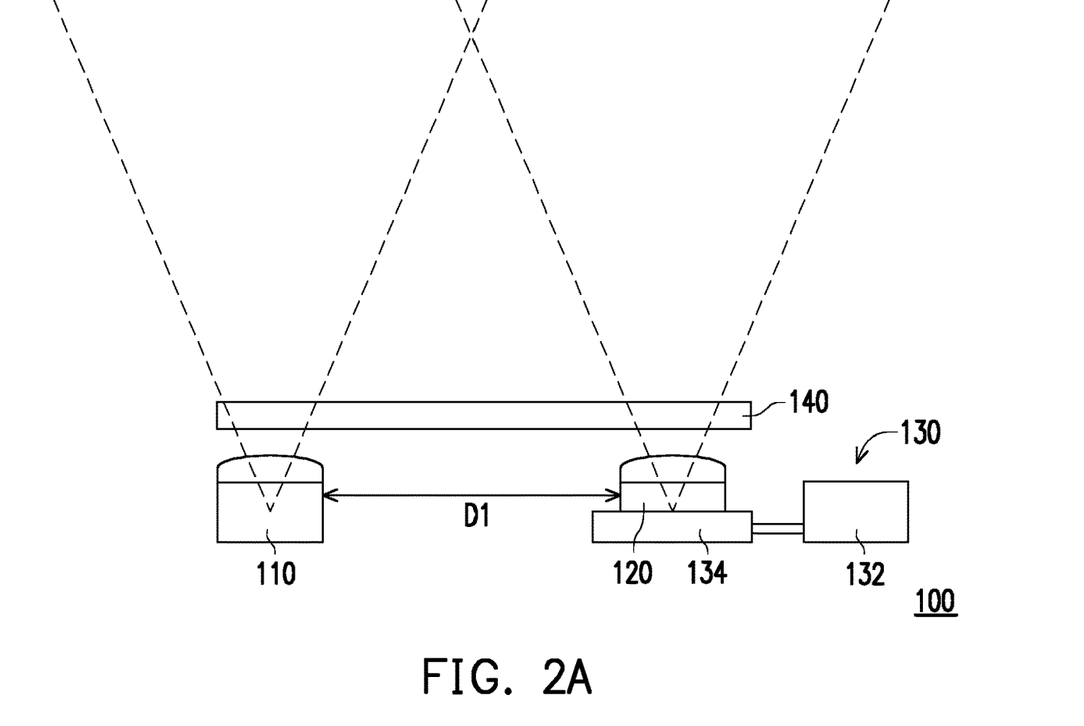
FIG. 2A and FIG. 2B are respectively side views of a dual lens imaging module of an embodiment of the invention before and after the lenses are moved.
Figure 2B:
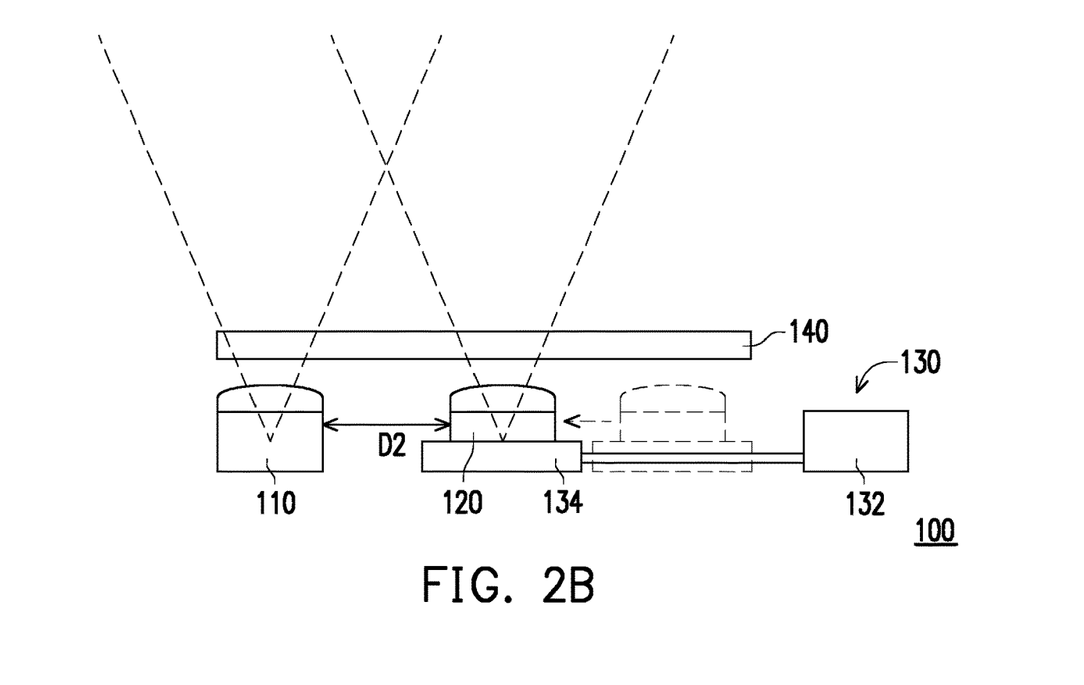

FIG. 2A and FIG. 2B are respectively side views of a dual lens imaging module of an embodiment of the invention before and after the lenses are moved. Please refer to FIG. 1 and FIG. 2A first. In the present embodiment, the dual lens imaging module 100 further includes a transparent substrate 140 for arranging the first lens 110 and the second lens 120, wherein the first lens 110 is a lens having an autofocus function. In the present embodiment, the surface of the transparent substrate 140 is aligned with the surface of the exterior of the electronic device 10. For example, the transparent substrate 140 is a plastic cover, and the surface thereof is aligned with the surface of the casing of the smart phone, but the invention is not limited thereto.

The moving module 130 is connected to the second lens 120. In detail, the moving module 130 includes a driving element 132 and a mounting element 134. The driving element 132 is connected to the mounting element 134, and the second lens 120 is disposed on the mounting element 134. In the present embodiment, the moving module 130 is a linear motor drive module. In other embodiments, the moving module 130 may be a voice coil motor (VCM) drive module, a shape memory alloy (SMA) component, a piezoelectric material module, or a Hall effect sensor, but the invention is not limited thereto.

Please refer to FIG. 1 to FIG. 2B first. In the present embodiment, the moving module 130 may move the second lens 120 such that the distance of the second lens 120 and the first lens 110 is changed from a spacing D1 before the movement to a spacing D2 after the movement, as shown in FIGS. 2A and 2B. Specifically, in the present embodiment, the driving element 132 is adapted to drive the mounting element 134 to move the second lens 120. Therefore, the change of the spacing of the first lens 110 and the second lens 120 enables the dual lens imaging module 100 to capture an object with a greater or smaller working distance, and also makes the dual lens imaging module 100 suitable for users with different eye spacing. In addition, the dual lens imaging module 100 may also capture a plurality of images at different positions by moving the second lens 120 to obtain a three-dimensional image capable of displaying a three-dimensional effect. As a result, the range of the working distance of the dual lens imaging module 100 may be improved, and the three-dimensional imaging may obtain a good display effect.

It is worth mentioning that in the present embodiment, an optimized three-dimensional image may be further obtained by using an algorithm. In detail, the first lens 110 having the autofocus function may be adjusted to capture a defocused image at a non-focusing point, and then the defocused image and the focused image previously obtained at the focus may be compared using the algorithm to obtain an optimized data. Lastly, the optimized data is combined with the previous three-dimensional image using the algorithm to obtain an optimized three-dimensional image having better depth information. As a result, the optimized three-dimensional imaging having better depth information may be obtained via defocused image capture and the operation of the algorithm.

In some embodiments, according to different types of the moving module 130, the second lens 120 may also be tilted to change the optical axis angle thereof, thereby improving the display effect of three-dimensional imaging, but the invention is not limited thereto. In addition, in some other embodiments, the moving module 130 may include a first moving module and a second moving module (not shown). The first moving module and the second moving module are respectively connected to the first lens 110 and the second lens 120. The first moving module is adapted to move or tilt the first lens 110, and the second moving module is adapted to move or tilt the second lens 120. In other words, in these embodiments, additional moving modules 130 may be provided to move the first lens 110 so that both lenses may be moved or tilted, but the invention is not limited thereto.

Figure 3:
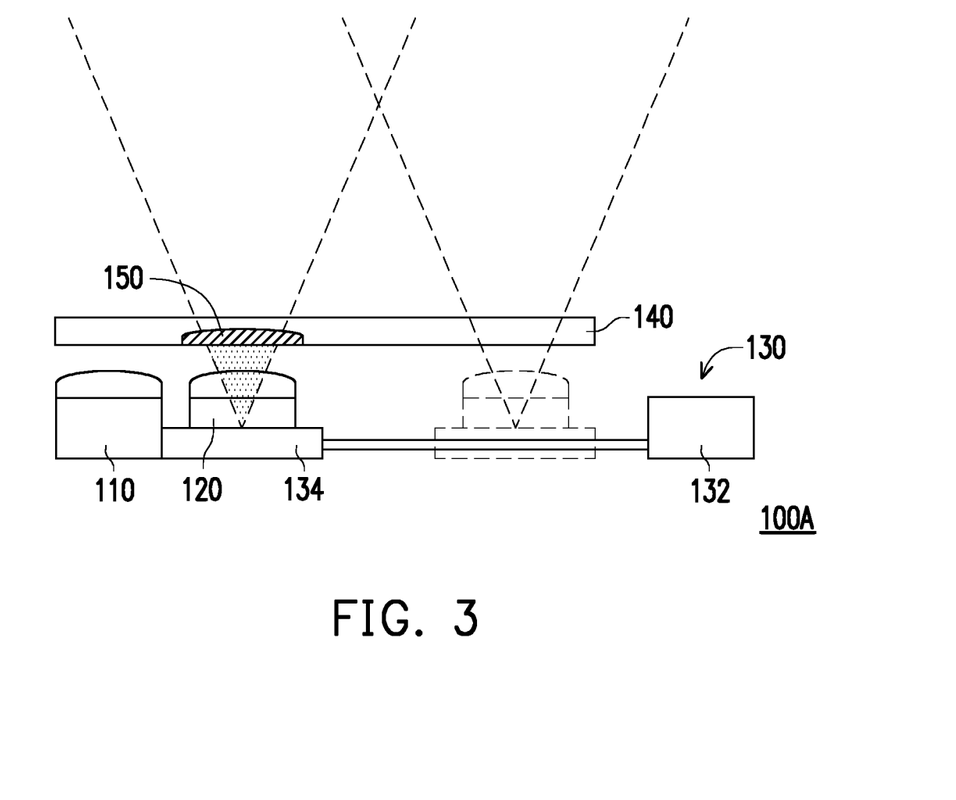
FIG. 3 is a side view of a dual lens imaging module of another embodiment of the invention.

FIG. 3 is a side view of a dual lens imaging module of another embodiment of the invention. Please refer to FIG. 3. A dual lens imaging module 100A of the present embodiment is similar to the dual lens imaging module 100 shown in FIG. 1. The difference between the two is that in the present embodiment, the dual lens imaging module 100A further includes an optical element 150 detachably disposed on the transparent substrate 140. The second lens 120 is adapted to be moved to an effective optical path of the optical element 140 via the moving module 130. In the present embodiment, the optical element 140 is, for example, a neutral density filter (ND filter). Therefore, when the second lens 120 is moved under the optical element 150 via the moving module 130, the light received by the second lens 120 may produce a filter effect by first passing through the optical element 150.

Figure 4:
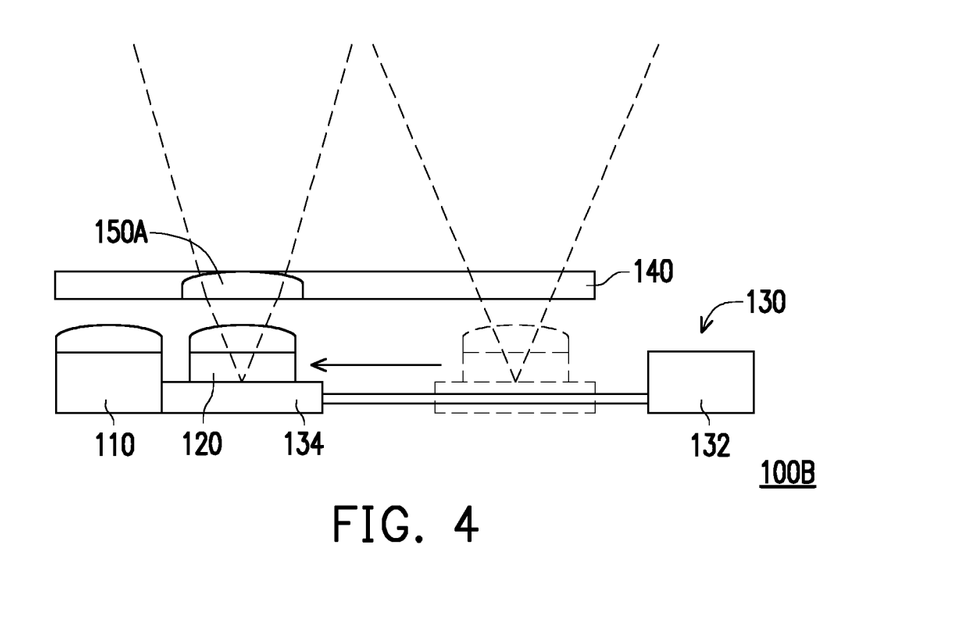
FIG. 4 is a side view of a dual lens imaging module of another embodiment of the invention.

FIG. 4 is a side view of a dual lens imaging module of another embodiment of the invention. Please refer to FIG. 4. A dual lens imaging module 100B of the present embodiment is similar to the dual lens imaging module 100A shown in FIG. 3. The difference between the two is that, in the present embodiment, an optical element 150A is, for example, at least one lens having a refractive power. Therefore, when the second lens 120 is moved under the optical element 150A via the moving module 130, the light received by the second lens 120 may produce an effect of different fields of view (FOV) via the optical element 150A. In the present embodiment, the optical element 150A may additionally adopt a color filter or a polarizer to achieve different optical imaging effects, and the invention is not limited thereto. Moreover, in these embodiments, the optical element 150A may be simply replaced via operation. In this way, the optical element 150A may be simply replaced as needed to obtain a variety of different optical imaging effects.

Figure 5:
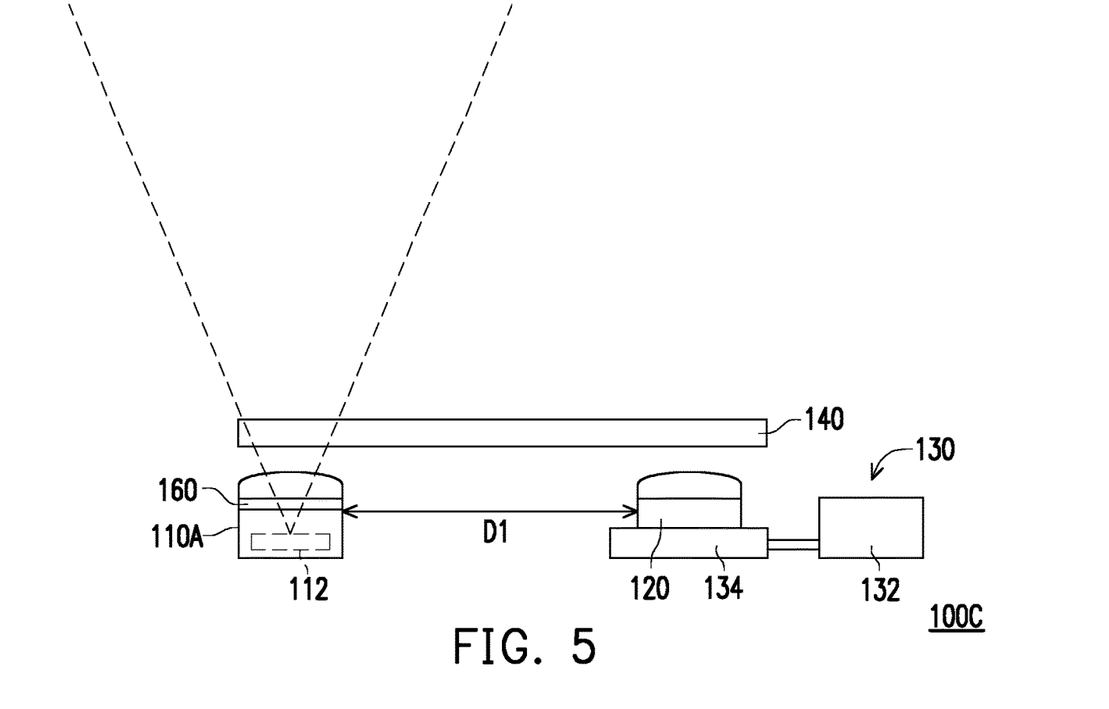
FIG. 5 is a side view of a dual lens imaging module of another embodiment of the invention.
Figure 6A:
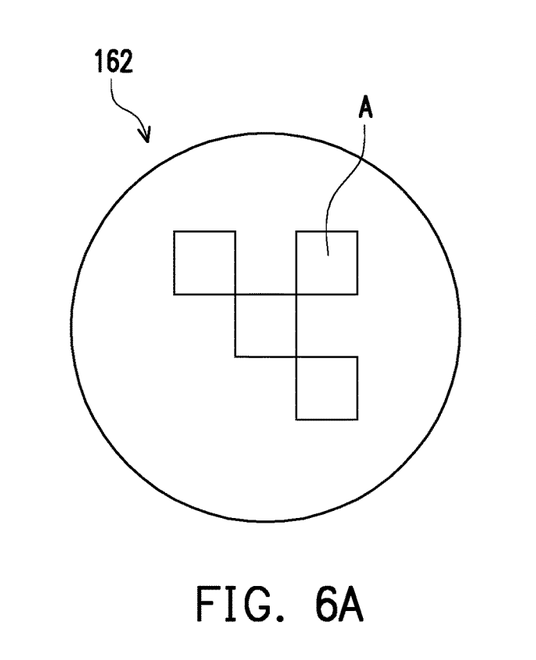
FIG. 6A and FIG. 6B are respectively top views of a portion of the depth identification module of FIG. 5.
Figure 6B:
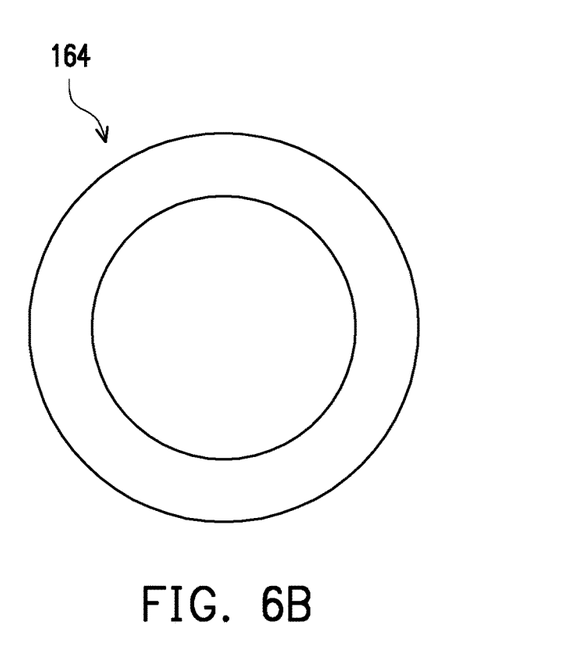
Figure 7:
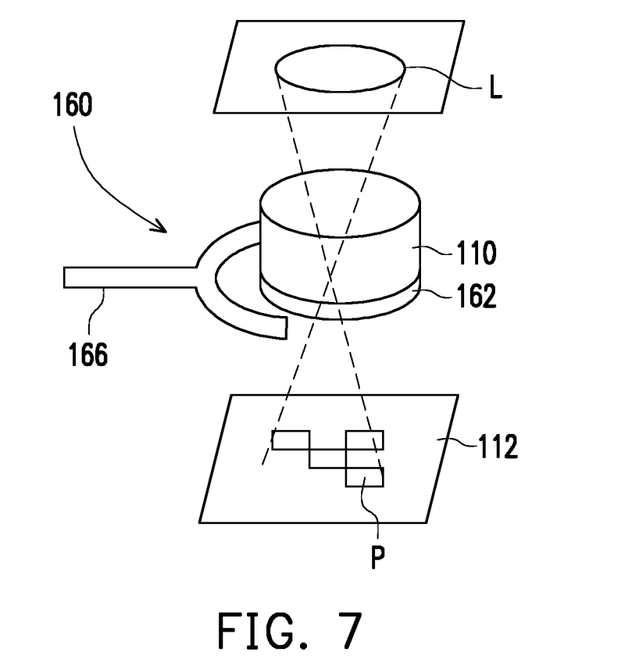
FIG. 7 is a defocused imaging view of the first lens in FIG. 5 of the invention.

FIG. 5 is a side view of a dual lens imaging module of another embodiment of the invention. FIG. 6A and FIG. 6B are respectively top views of a portion of the depth identification module of FIG. 5. FIG. 7 is a defocused imaging view of the first lens in FIG. 5 of the invention. Please refer to FIG. 5 to FIG. 7. A dual lens imaging module 100C of the present embodiment is similar to the dual lens imaging module 100 shown in FIG. 2A. The difference between the two is that in the present embodiment, the dual lens imaging module 100C further includes a depth identification module 160 disposed at the first lens 110. In the present embodiment, the depth identification module 160 is a plurality of aperture switching modules for switching different apertures to change the first lens 110 to a photography function or a depth-sensing function. Specifically, the depth identification module 160 includes a first aperture 162, a second aperture 164, and a switching element 166. The first aperture 162 is a special aperture having a light-shielding pattern A, as shown in FIG. 6A. In the present embodiment, the light-shielding pattern A is an asymmetrical pattern, and the light-shielding pattern A is formed by a light-shielding film. However, the invention does not limit the material, shape, size, or number for forming the light-shielding pattern A.

The second aperture 164 is an aperture used for general photography, as shown in FIG. 6B. The switching element 166 is adapted to switch the first aperture 162 and the second aperture 164 to the effective optical path of the first lens 110, but the invention does not limit the form and type of the switching element 166. When the switching element 166 switches the first aperture 162 having the light-shielding pattern A to the effective optical path of the first lens 110, the first lens 110 may capture a defocused image via the autofocus system of the first lens 110. Since the first aperture 162 has the light-shielding pattern A, the image captured in the defocused state displays the light-shielding pattern A, as shown in FIG. 7. The size of the pattern displayed by the captured image varies depending on the different defocus positions. In other words, when the first aperture 162 is switched to the effective optical path of the first lens 110, the first lens 110 may be used as a depth sensor. In this way, the depth information of the image may be obtained by changing the focus state via a single lens, thereby further optimizing the three-dimensional image. In an embodiment, the autofocus element of the first lens 110 may be electrically connected to the depth identification module 160 to passively measure depth. In this way, power saving effect may be further achieved.

Figure 8:
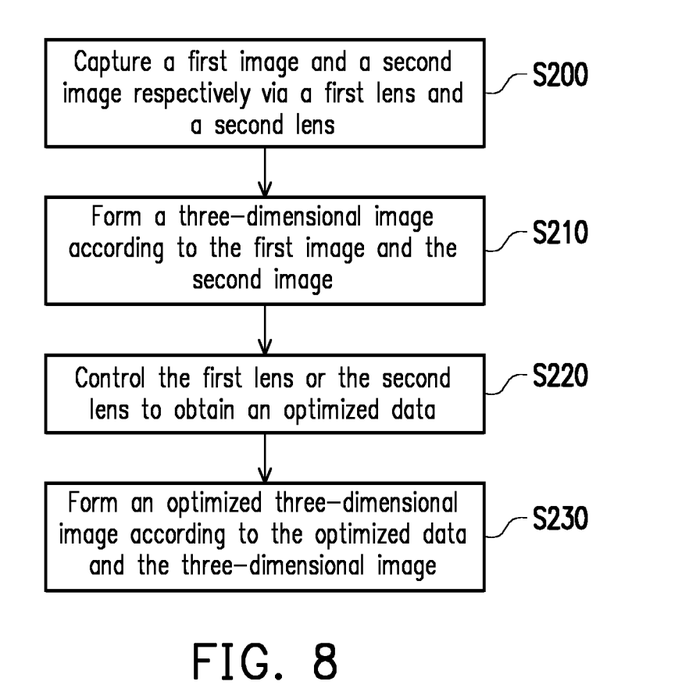
FIG. 8 is a flowchart of the steps of a capturing method of a dual lens imaging module of an embodiment of the invention.

FIG. 8 is a flowchart of the steps of a dual lens imaging module capturing method of an embodiment of the invention. Please refer to FIG. 2B and FIG. 8. The present embodiment provides a capturing method of a dual lens imaging module that is at least applicable to the dual lens imaging module 100 shown in FIG. 2B. Therefore, the following is exemplified by the dual lens imaging module 100 shown in FIG. 2B. However, the invention is not limited thereto. In the present embodiment, step 200 is first performed, and a first image and a second image are respectively captured via the first lens 110 and the second lens 120. Then, after the above step, step S210 is performed to form a three-dimensional image according to the first image and the second image. That is, after the images respectively captured by the first lens 110 and the second lens 120 are used as the left image and the right image, the left image and the right image are combined into a three-dimensional image having depth information.

Then, after the above step, step S220 is performed to control the first lens 110 to obtain an optimized data. For example, in an embodiment, the focal length of the first lens 110 may be changed first, and then a defocused image is captured via the first lens 110. Lastly, an optimized data is obtained according to the defocused image. In some embodiments, the second lens 120 may also be operated to capture a defocused image in the same manner, and the invention is not limited thereto. As another example, in another embodiment, an aperture having a light-shielding pattern may be switched to the effective optical path of the first lens 110, and a defocused image is captured via the first lens 110. Lastly, the pattern change of the defocused image is identified to measure the optimized data.

Then, after the above step, step S230 is performed to form an optimized three-dimensional image according to the optimized data and the three-dimensional image. Specifically, in the present embodiment, a depth data is first obtained according to the three-dimensional image, and the depth data is modified according to the optimized data to form an optimized three-dimensional image. Sufficient teaching of the method for obtaining the depth data according to the three-dimensional image may be obtained from the manner of moving the second lens 120, and therefore is not be repeated herein.

Based on the above, in the dual lens imaging module and the capturing method thereof of the invention, the first lens is a lens having an autofocus function, and the second lens is connected to the moving module to move or tilt to change the spacing with the first lens. Therefore, the dual lens imaging module may be used to capture an object with a greater or smaller working distance, and at the same time is suitable for users with different eye spacing. In addition, the dual lens imaging module may also capture a plurality of images at different positions by moving the second lens to obtain a three-dimensional image capable of displaying a three-dimensional effect. As a result, the range of the working distance of the dual lens imaging module may be improved, and the three-dimensional imaging may obtain a good display effect.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A dual lens imaging module suitable for an electronic device, comprising:
   a first lens;
   a second lens;
   a moving module connected to the second lens and adapted to move or tilt the second lens, wherein the first lens is a lens having an autofocus function, and a working distance of the dual lens imaging module is adapted to be changed according to a spacing of the first lens and the second lens; and
   a transparent substrate disposed to cover the first lens and the second lens; and
   an optical element detachably disposed on the transparent substrate, and the second lens is adapted to be moved to an effective optical path of the optical element via the moving module.

2. The dual lens imaging module of claim 1, wherein a surface of the transparent substrate is aligned with a surface of an exterior of the electronic device.

3. The dual lens imaging module of claim 1, wherein the optical element is at least one lens having a refractive power, a neutral grayscale filter, a color filter, or a polarizer.

4. The dual lens imaging module of claim 1, wherein the moving module comprises a driving element and a carrying platform, the driving element is connected to the carrying platform, the second lens is disposed on the carrying platform, and the driving element is adapted to drive the carrying platform to move or tilt the second lens.

5. The dual lens imaging module of claim 1, wherein the moving module is a linear motor drive module, a voice coil motor drive module, a shape memory alloy component, a piezoelectric material module, or a Hall effect sensor.

6. The dual lens imaging module of claim 1, wherein the moving module comprises a first moving module and a second moving module, the first moving module and the second moving module are respectively connected to the first lens and the second lens, the first moving module is adapted to move or tilt the first lens, and the second moving module is adapted to move or tilt the second lens.

7. The dual lens imaging module of claim 1, further comprising:
   a depth identification module disposed at the first lens, wherein the depth identification module comprises a first aperture, a second aperture, and a switching element, the switching element is adapted to switch the first aperture and the second aperture to an effective optical path of the first lens or the second lens, and the first aperture has a light-shielding pattern.

8. The dual lens imaging module of claim 7, wherein the light-shielding pattern is formed by a light-shielding film.

9. The dual lens imaging module of claim 7, wherein the light-shielding pattern is an asymmetrical pattern.

10. A capturing method of a dual lens imaging module, wherein the duel lens imaging module comprises a first lens and a second lens, and the capturing method of the dual lens imaging module comprises:
    capturing a first image and a second image via the first lens and the second lens respectively;

forming a three-dimensional image according to the first image and the second image;

controlling the first lens or the second lens to obtain an optimized data; and forming an optimized three-dimensional image according to the optimized data and the three-dimensional image, wherein the step of controlling the first lens or the second lens to obtain the optimized data comprises:

switching an aperture to an effective optical path of the first lens, wherein the first lens is a lens having an autofocus function;

capturing a defocused image via the first lens automatically; and identifying a pattern change of the defocused image to measure the optimized data, wherein the aperture has a fight-shielding pattern.

11. The capturing method of the dual lens imaging module of claim 10, wherein the step of forming the optimized three-dimensional image according to the optimized data and the three-dimensional image comprises:

obtaining a depth data according to the three-dimensional image; and modifying the depth data according to the optimized data to form the optimized three-dimensional image.

* * * * *